United States Patent [19]
Fukui et al.

[11] Patent Number: 5,113,821
[45] Date of Patent: May 19, 1992

[54] VEHICLE SPEED GOVERNOR

[75] Inventors: Wataru Fukui; Toshio Iwata; Atsushi Ueda; Masami Matsumura; Mitsura Koiwa, all of Himeji, Japan

[73] Assignee: Mitsubishi Denki Kabushiki Kaisha, Tokyo, Japan

[21] Appl. No.: 699,113

[22] Filed: May 13, 1991

[30] Foreign Application Priority Data

May 15, 1990 [JP] Japan .................. 2-122999

[51] Int. Cl.⁵ .............................. F02P 9/00
[52] U.S. Cl. ........................ 123/335; 123/340
[58] Field of Search .......... 123/335, 340, 332, 334; 180/178, 179; 364/431.07

[56] References Cited

U.S. PATENT DOCUMENTS

| | | | |
|---|---|---|---|
| 3,547,216 | 12/1970 | Marie | 123/335 |
| 4,192,279 | 3/1980 | Maisch et al. | 123/335 |
| 4,336,778 | 6/1982 | Howard | 123/335 |
| 4,403,970 | 9/1983 | Dretzka et al. | 123/335 |
| 4,553,517 | 11/1985 | Andreasson | 123/335 |
| 4,812,671 | 3/1989 | Furrow | 123/335 |
| 4,883,033 | 11/1989 | Hosoe et al. | 123/335 |
| 4,966,115 | 10/1990 | Ito et al. | 123/335 |
| 5,002,028 | 3/1991 | Arai et al. | 123/340 |
| 5,009,208 | 4/1991 | Fiorenza, II | 123/335 |

FOREIGN PATENT DOCUMENTS 136569 5/1990 Japan .................. 123/335

Primary Examiner—Raymond A. Neill
Attorney, Agent, or Firm—Sughrue, Mion, Zinn, Macpeak and Seas

[57] ABSTRACT

A speed governor for a vehicle with an internal combustion engine senses an engine operating condition indicating the vehicle speed. When the vehicle speed indicated by the operating condition exceeds a prescribed speed, the cylinders of the engine are temporarily prevented from firing for short periods until the vehicle speed falls below the prescribed speed. In one form of the invention, a first sensor that senses a first operating condition is used to determine the vehicle speed under normal operating conditions. When the first sensor becomes inappropriate or malfunctions, a second sensor that senses another operating condition is used to determine the vehicle speed.

20 Claims, 5 Drawing Sheets

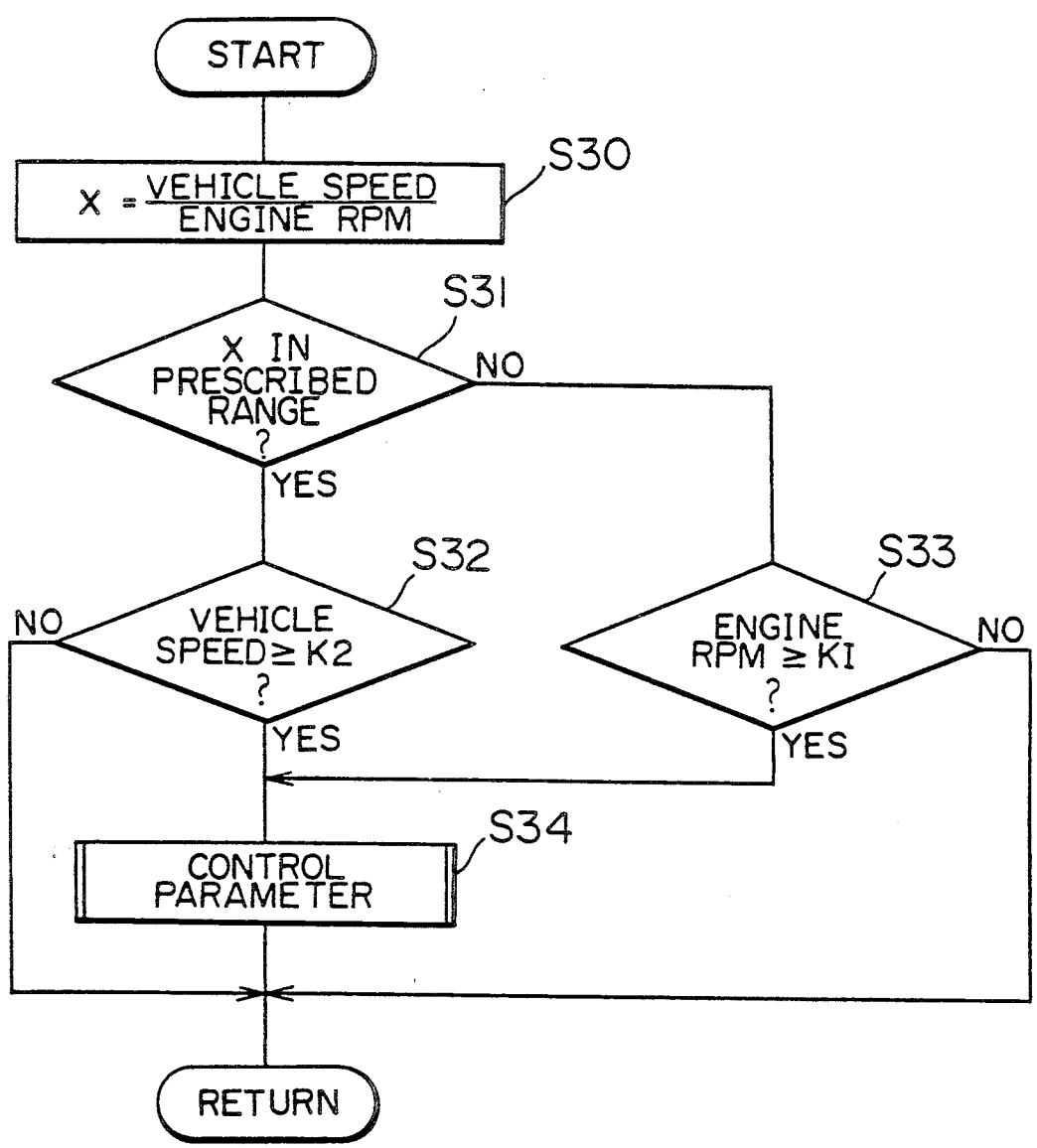

VEHICLE SPEED GOVERNOR

BACKGROUND OF THE INVENTION

This invention relates to a speed governor for a vehicle equipped with an internal combustion engine which can limit the speed of the vehicle to a desired value. A speed governor according to the present invention is useful for preventing damage to the engine of a vehicle due to excessive rotational speeds. It can also be used to automatically limit the vehicle speed to any desired level, such as the legal speed limit of the road on which the vehicle is traveling.

A speed governor is a device which limits the speed of a vehicle to a prescribed level for purposes of safety and to prevent damage to the engine of the vehicle from operation at extremely high rotational speeds. One conventional speed governing method is to stop combustion in the engine for a continuous period from the point in time that the vehicle speed exceeds a prescribed level until the speed falls to an acceptable level. Combustion can be stopped by cutting off the supply of fuel to the cylinders or by cutting off the current to an ignition coil for igniting the spark plugs for the cylinders. However, this conventional method has a number of problems. One problem is that since combustion is continuously stopped until the vehicle speed falls to an acceptable level, the temperature of the engine cylinders falls due to cooling by intake air or fuel. Therefore, when combustion is restarted once the vehicle speed reaches the acceptable level, the cooled cylinders may be damaged by thermal shock. Furthermore, when combustion is suddenly stopped, the engine torque abruptly falls to zero, and this can produce jerking of the vehicle which degrades the comfort of the ride. In addition, when combustion is continuously stopped, uncombusted fuel is discharged from the engine in large quantities. Not only is the uncombusted fuel an environmental problem, but the fuel may undergo after-burning or post ignition which can damage the exhaust valves and other parts of the engine.

SUMMARY OF THE INVENTION

Accordingly, it is an object of the present invention to provide a speed governor for a vehicle which can limit the vehicle speed without causing damage to the engine of the vehicle due to thermal shock.

It is another object of the present invention to provide a speed governor for a vehicle which prevents the engine from discharging large amounts of uncombusted fuel when the governor is operating.

It is still another object of the present invention to provide a speed governor for a vehicle which can limit the vehicle speed without degrading the ride comfort of the vehicle.

A vehicle speed governor according to the present invention senses a vehicle operating condition indicative of the vehicle speed. When the vehicle speed indicated by the operating condition exceeds a prescribed level, a vehicle operating parameter is controlled so as to decrease the speed of the vehicle below the prescribed level. In one form of the present invention, the vehicle speed is decreased by periodically stopping combustion in the engine by cutting off the supply of fuel to the engine or cutting off the current to spark plugs of the engine. In other forms of the present invention, the vehicle speed is decreased by applying the brakes of the vehicle or by decreasing the opening of a throttle valve for the engine.

The vehicle speed governor may include a plurality of different sensors, each of which measures a different vehicle operating condition indicative of the vehicle speed. In one form of the present invention, a first one of the plurality of sensors is used to detect the vehicle speed during normal operating conditions, and when the first sensor malfunctions or an operating condition occurs in which the first sensor can not accurately sense the vehicle speed, a second one of the plurality of sensors is used to sense the vehicle speed instead of the first sensor.

BRIEF DESCRIPTION OF TH DRAWINGS

FIGS. 3 through 6 are flow charts of different modes of operation of the embodiment of FIG. 1.

DESCRIPTION OF THE PREFERRED EMBODIMENTS

Figure 1:
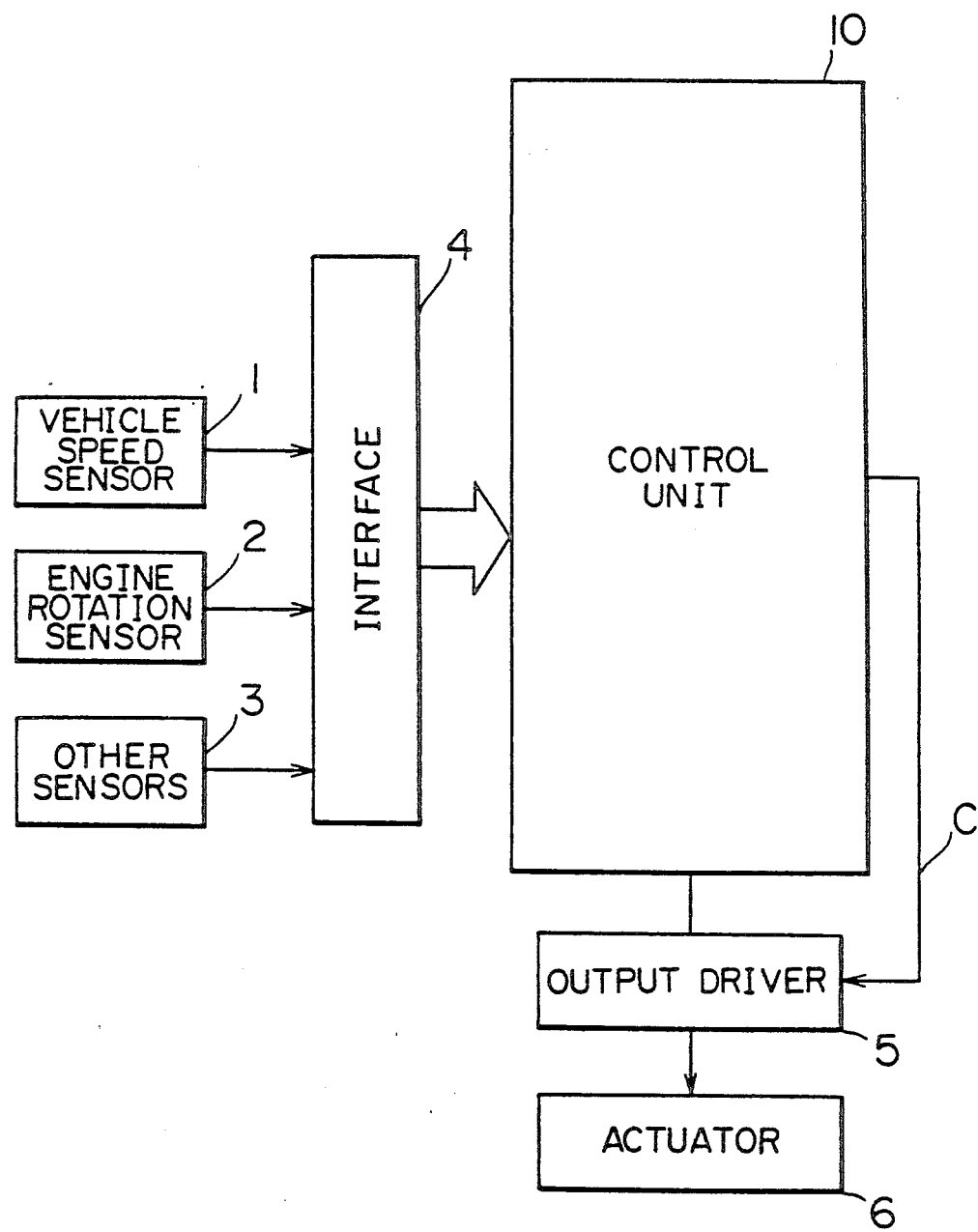
FIG. 1 is a block diagram of an embodiment of a speed governor according to the present invention.

FIG. 1 is a block diagram of an embodiment of a speed governor according to the present invention as applied to an unillustrated vehicle equipped with an unillustrated multicylinder internal combustion engine. This embodiment includes a conventional vehicle speed sensor 1 for measuring the speed of the vehicle and producing a corresponding output signal. Any type of vehicle speed sensor 1 can be employed, such as one which measures the rotational speed of the drive shaft of the vehicle, or a wheel speed sensor such as is used in an anti-lock braking system for sensing the rotational speed of the wheels of the vehicle. A conventional engine rotation sensor 2 senses the rotation of the engine and generates a corresponding output signal indicative of the engine rotational speed. The vehicle is equipped with a plurality of other sensors 3 for sensing various operating conditions of the engine and the vehicle and generating corresponding output signals. Examples of typical operating conditions which can be sensed by the other sensors 3 are the gear position of a transmission of the vehicle, the degree of opening of a throttle valve for the engine, the operating state of the brakes, the fuel temperature, and the engine cylinder temperature.

The output signals from the vehicle speed sensor 1, the engine rotation sensor 2, and the other sensors 3 are input to a control unit 10 via an interface 4. Based on these output signals, the control unit 10 generates a control signal C for an output driver 5, which drives an acturator 6 which controls an operating parameter of the engine or the vehicle. In the present embodiment, the actuator 6 comprises an ignition coil for supplying current to spark plugs of the engine, but various other types of actuators can be employed, such as fuel injectors for the engine, a motor for opening and closing a throttle valve for the engine, or a brake actuator for actuating the brakes of the vehicle.

The control unit 10 typically comprises a microcomputer having a CPU and various memories. If the output signals from the sensors 1-3 are in the form of analog signals, the control unit 10 will usually include an A/D converter, and if the signals are alternating current signals having a frequency corresponding to the quantity being measured, the control unit 10 will also include a frequency-voltage converter. If the sensors 1-3 are encoders or the like which generate digital output signals, an A/D converter and a frequency-voltage converter are unnecessary, so the cost of the control unit 10 can be decreased. At the same time, its resistance to external noise and accuracy can be increased.

Based on the output signals from the sensors 1-3, the control unit 10 determines whether the speed of the vehicle exceeds a prescribed speed. If the vehicle speed exceeds the prescribed speed, the control unit 10 generates control signal C for driving the actuator 6 so as to gradually decrease the vehicle speed.

Various methods can be used in the present invention for decelerating the vehicle when the control unit 10 determines that the vehicle is traveling above the prescribed speed. One method is to decrease the "combustion ratio" of the engine. The combustion ratio refers to the precent of time of engine operation for which combustion is taking place in the engine. Normally, when all the cylinders are operating properly, the combustion ratio is 100, since combustion is taking place 100% of the time. However, if combustion is periodically stopped, the combustion ratio will fall below 100%. In a conventional engine governor, when the vehicle speed exceeds a prescribed speed, the combustion ratio is set to 0%, i.e., combustion is continuously stopped until the vehicle speed falls below the prescribed speed, so the engine cools down significantly and engine torque falls to zero. In the present invention, the combustion ratio is decreased to a value between 0 and 100%, so instead of being continuously stopped, combustion is periodically stopped for short periods of time so that the engine will not cool down during the periods when there is no combustion and so that the engine torque will be only partially decreased.

Figure 2:
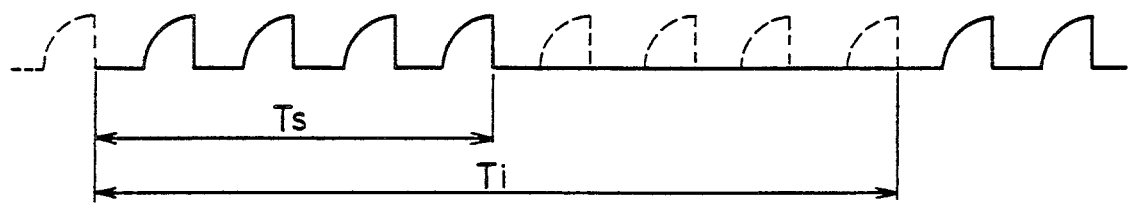
FIG. 2 is a waveform diagram of a signal applied to an ignition coil during the operation of the embodiment of FIG. 1.

One method of adjusting the combustion ratio is by controlling the ignition coil of the vehcile so as to cut off the current to the spark plugs of the engine. FIG. 2 is a wave form diagram of ignition pulses provided to the ignition coil of the vehicle by the output driver 5 when the control unit 10 is decelerating the vehicle. Each pulse causes the ignition coil to produce ignition in one cylinder of the engine. The solid lines indicate ignition pulses which are actually generated by the output driver 5, while the dashed lines indicate pulses which would be generated if the combustion ratio were 100% but which are not generated when the combustion ratio is reduced to decelerate the vehicle. Ti indicates a predetermined period, such as 100 msec, and Ts indicates the length of time during period Ti during which the cylinders are ignited. The combustion ratio is defined as Ts/Ti. In this example, Ts is approximately 50 msec, so here the combustion ratio is equal to 50%. The higher the combustion ratio, the higher the percentage of the time that combustion takes place in the engine, so the higher is the output of the engine.

The combustion ratio is determined by the control unit 10 based on a number of factors, such as the amount by which the vehicle speed exceeds the prescribed speed and the engine load (as indicated by the throttle valve opening). The more the vehicle speed has exceeded the prescribed speed, the smaller the value that the combustion ratio is set to so as to more rapidly decrease the vehicle speed. When the difference between the vehicle speed and the prescribed speed is small, the combustion ratio is set to a relatively large value to prevent the engine from hunting due to feedback control. The higher the engine load, the higher is the value to which the combustion ratio is set to prevent jerking of the vehicle when the engine torque is decreased. The relationship between the combustion ratio and the various above-mentioned factors can be stored in advance in a memory of the control unit 10, and the proper or preferred combustion ratio can be found by a table look-up operation.

In order to prevent the cylinders from excessive cooling during the periods that combustion is stopped, combustion should not be stopped in any given cylinder of the engine for more than a prescribed length of time. The prescribed length of time will depend on factors such as the present engine operating temperature and so on.

The control unit 10 controls the ignition coil so that in a period of Ti seconds, cylinders fire during a period of Ts seconds and are then prevented from firing for a period of (Ti−Ts) seconds. At the end of one period of Ti seconds, a new period of Ti seconds begins, and the control unit 10 repeats the process of allowing combustion for Ts seconds and then preventing combustion for (Ti−Ts) seconds.

In the present invention, combustion is stopped for only short periods of time, so the cylinders do not undergo thermal shock when combustion is restarted. In addition, uncombusted fuel is not continuously discharged from the engine, so engine damage due to afterburning can be prevented. Furthermore, even though the engine torque is zero during the periods of length (Ti−Ts) when the combustion is stopped, since these periods are very short, when averaged over a number of engine rotations, the engine torque is only partially decreased from its value at a combustion ratio of 100%. Therefore, the vehicle does not undergo jerking when speed governing is initiated, and the ride comfort of the vehicle is not degraded.

Figure 3:
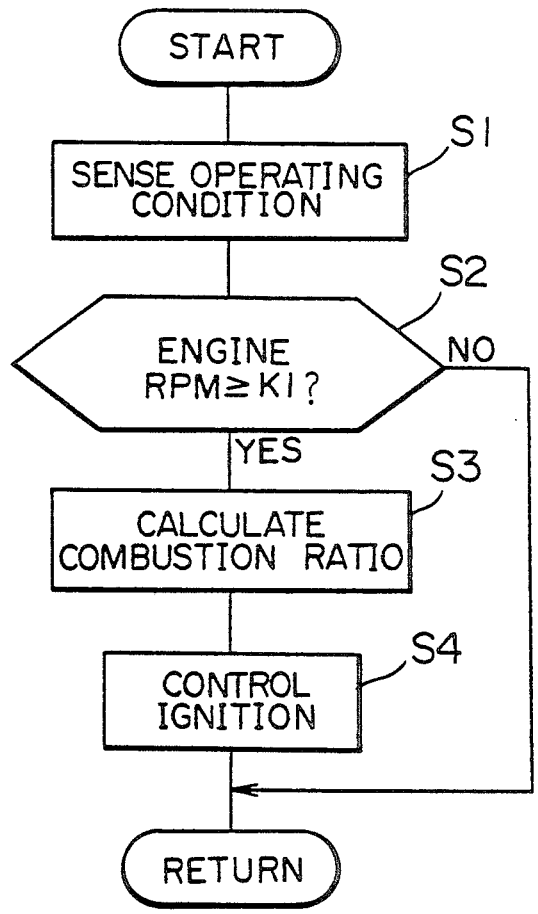

FIG. 3 is a flow chart illustrating an operating mode of the embodiment of FIG. 1 in which the combustion ratio is adjusted by controlling the firing of the cylinders. In step S1, the control unit 10 senses various operating conditions of the vehicle based on the input signals from the sensors 1-3. In Step S2, the control unit 10 calculates the engine rotational speed based on the output signal from the engine rotation sensor 2 and determines whether the engine rotational speed is greater than or equal to a predetermined first value K1. The first value K1 corresponds to a desired maximum vehicle speed when the transmission of the vehicle is in its highest gear. If the engine rotational speed is less than the first value K1, it is not necessary to reduce the vehicle speed, so a return is performed without the combustion ratio being changed. However, if the engine rotational speed is greater than or equal to the first value K1, it is necessary to reduce the engine output in order to decrease the vehicle speed, so in Step S3, the control unit 10 calculates a suitable combustion ratio based on the present engine rotational speed and other operating conditions of the vehicle. In Step S4, the control until 10 generates a control signal C, and in response the output driver 5 controls the actuator 6 (the ignition coil) so as to attain the combustion ratio calculated in Step S3, and then a return is performed.

The sequence of operations illustrated in FIG. 3 is repeated by the control unit 10 at predetermined intervals.

Figure 4:
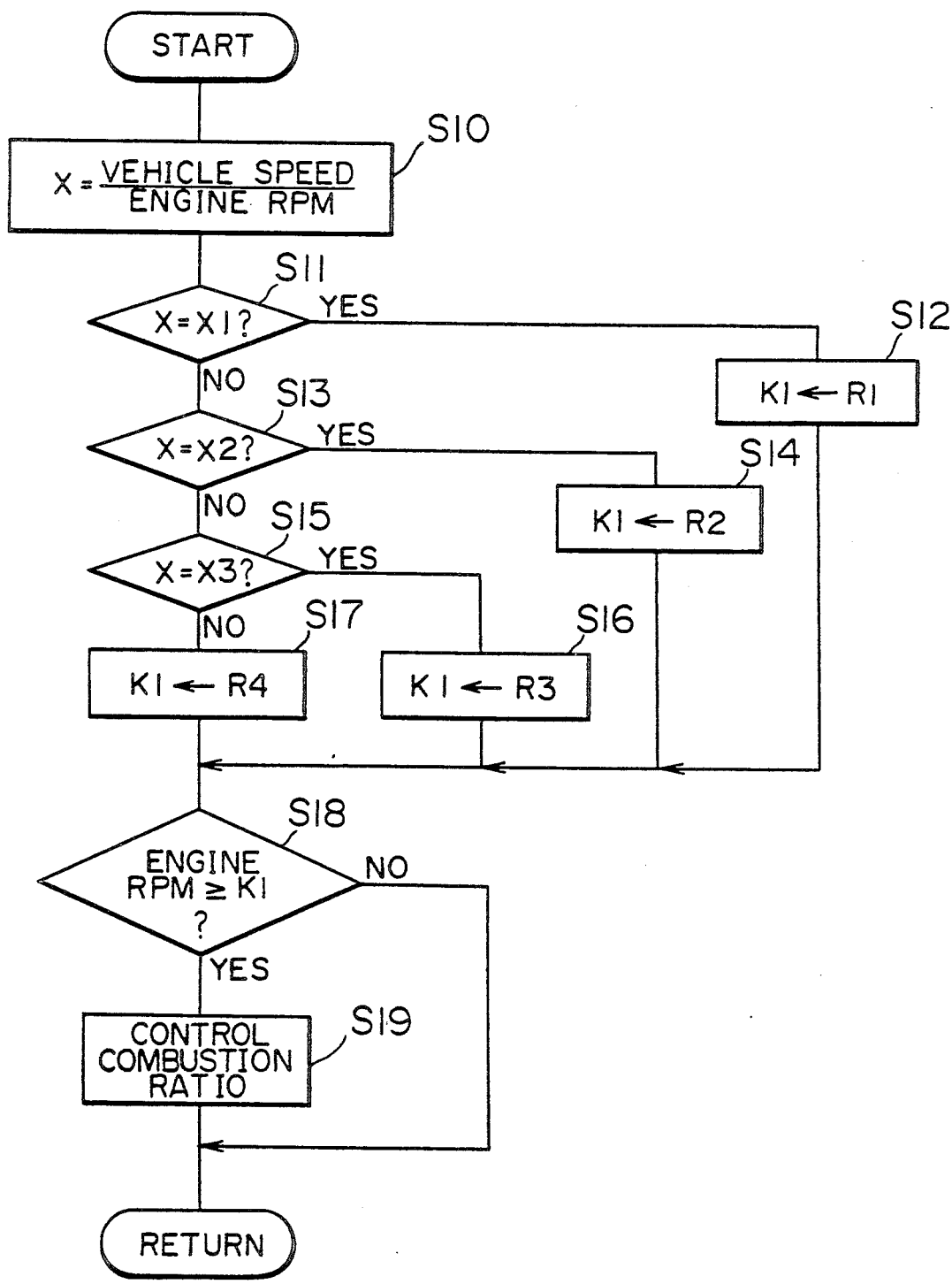

In the operating mode illustrated in FIG. 2, the vehicle speed is limited only when the engine rotational speed exceeds a value corresponding to operation of the transmission of the vehicle in its highest gear. However, it is often desirable to limit the engine output when the transmission is in lower gears as well. FIG. 4 is a flow chart illustrating another mode of operation of the embodiment of FIG. 1 in which the vehicle speed is limited to different levels depending upon the present gear position of the transmission. FIG. 4 illustrates the operation for a vehicle transmission having four forward speeds, but the number of gear positions of the transmission is not important.

In Step S10, the control unit 10 calculates the ratio X of the vehicle speed to the engine rotational speed based on the output signals from the vehicle speed sensor 1 and the engine rotation sensor 2. This ratio is proportional to the reduction ratio of the transmission in its current gear. In Step S11–S15, the control unit 10 determines the gear position of the transmission by successively checking whether the ratio X equals X1 (the value of X when the transmission is in first gear), X2 (the value of X when the transmission is in second gear), or X3 (the value of X when the transmission is in third gear). If X is equal to any one of X1–X3, then in Step S12, S14, or S16, the first value K1 (the engine rotational speed limit) is set to values of R1, R2, or R3 corresponding to first, second, or third gear, respectively. If in Steps S11–S15 the gear position is not found to be any of the first through third gears, then by default the transmission is running in fourth gear, so in Step S17, the first value K1 is set to a value of R4 corresponding to fourth gear. In Step S18, it is determined whether the engine rotational speed is greater than or equal to the first value K1. If not, then a return is performed. If the engine rotational speed exceeds the first value K1, then in Step S19, the combustion ratio is controlled in the same manner as described with respect to FIG. 3 so as to decrease the engine output and the vehicle speed. A return is then performed.

This mode of operation provides the same benefits as the operating mode of FIG. 3, regardless of the gear in which the transmission of the vehicle is operating.

If the other sensors 3 include one that senses the current gear position of the transmission, the control unit 10 can determine the gear position directly from the output signal and set the first value K1 to the appropriate value without having to calculate the ratio X in Step S10 or perform the series of comparisons in Steps S11, S13, and S15.

Instead of adjusting the combustion ratio by controlling the time periods Ti and Ts, the control unit 10 can count the ignition pulses and control the ratio of the number of successive ignition pulses which are generated to the number of successive ignition pulses which are not generated and attain the same combustion ratio.

In the operating modes illustrated in FIGS. 3 and 4, the actuator 6 is an ignition coil, and the control unit 10 adjusts the combustion ratio by cutting off the current to the ignition coil. If the actuator 6 instead comprises a plurality of fuel injectors for the engine, the control unit 10 can control the combustion ratio by periodically preventing the fuel injectors from supplying fuel to the engine for short periods. With reference to FIG. 2, for every period of Ti seconds, the control unit 10 can supply fuel to the cylinders for a period of Ts seconds by driving the fuel injectors, and then cut off the supply of fuel for (Ti−Ts) seconds by not driving the fuel injectors. The combustion ratio Ts/Ti can be determined based on the same factors as when it is controlled by cutting off current to the spark plugs.

It is also possible to simultaneously stop the operation of both the ignition coil and the fuel injectors when it is desired to stop combustion so that when no spark is generated in a given cylinder, no fuel is supplied to that cylinder. This arrangement can decrease the amount of uncombusted fuel which is discharged from the engine.

As mentioned above, the actuator 6 is not limited to a device for controlling the combustion ratio of the engine. For example, it can be a brake actuator which applies the brakes or a throttle control motor which decreases the opening of the throttle valve when the control unit 10 determines that the vehicle speed exceeds the prescribed limit. Furthermore, it is possible to employ more than one actuator at the same time. For example, an actuator 6 in the form of an ignition coil can be used in combination with an actuator 6 in the form of a brake actuator. In this case, the control unit 10 can decelerate the vehicle by simultaneously reducing the combustion ratio and applying the brakes.

In the operating modes illustrated in FIGS. 3 and 4, the vehicle speed is determined based on the engine rotational speed as indicated by the engine rotation sensor 2. It is possible to sense the vehicle speed from the vehicle speed sensor 1, but it is preferable to use the engine rotation sensor 2 since engine rotation sensors are usually more durable and less prone to failure than are vehicle speed sensors. However, there are occasions in which the engine rotation sensor 2 becomes unsuitable for sensing the vehicle speed. For example, in a tansient operating state such as when the clutch of the vehicle is only partly engaged immediately after a gear change and there is slippage between the input and output shafts of the transmission, the engine rotational speed does not accurately indicate the vehicle speed. Furthermore, the engine rotation sensor 2 may malfunction and become unable to sense the vehicle speed, even during a steady operating state. Therefore, when the engine rotation sensor 2 becomes unsuitable, either due to the vehicle operating conditions or malfunction, it is desirable for the control unit 10 to determine the vehicle speed based on the output signal from one of the other sensors.

Figure 5:
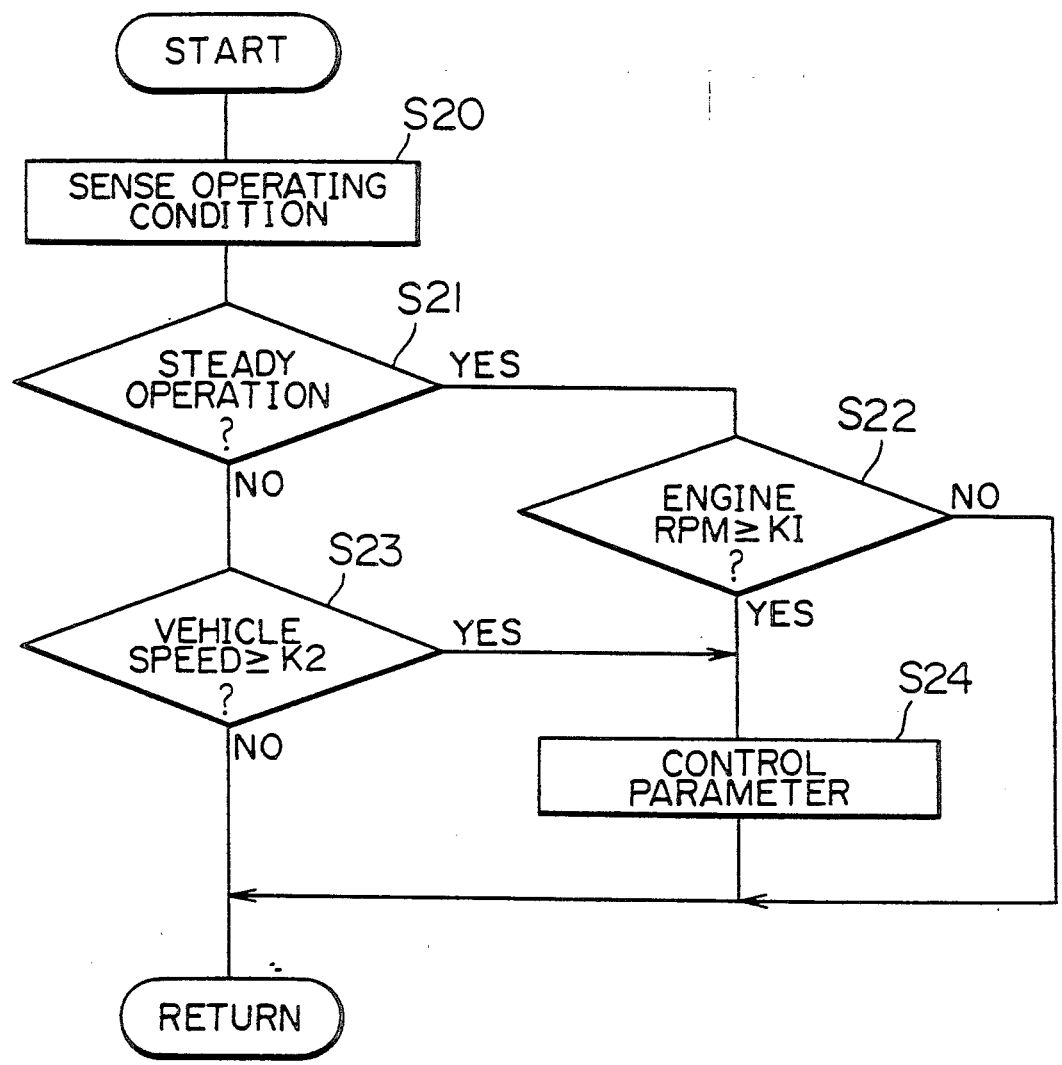

FIG. 5 is a flow chart of an operating mode of the embodiment of FIG. 1 in which the control unit 10 normally uses the output signal of the engine rotation sensor 2 to determine the vehicle speed but uses the output signal of the vehicle speed sensor 1 when the engine rotation sensor 2 becomes inappropriate.

In Step S20, the control unit 10 senses an operating condition of the vehicle based on the inputs from the sensors 1–3. In Step S21, based on the sensed operating condition, the control unit 10 determines whether the vehicle is operating in a steady state in which the engine rotation sensor 2 accurately reflects the vehicle speed. This determination can be made based on a gear change in the transmission, for example. If the vehicle operating condition is a steady one, then in Step S22, the control unit 10 compares the engine rotational speed with a first value K1. If the engine rotational speed is less than the first value K1, a return is performed, while if it is greater than or equal to the first value K1, in Step S24, the control unit 10 controls an operating parameter of the vehicle, such as the combustion ratio, the throttle opening, or the brake pressure, so as to decrease the vehicle speed. If in Step S21 it is determined that the vehicle operating condition is a transient one, such as when the clutch is in a half-engaged state, the control unit 10 uses the output signal from the vehicle speed sensor 1 as an indication of the vehicle speed, and in Step S23, the control unit 10 determines whether the vehicle speed is greater than or equal to a second value K2. (A vehicle speed of K2 corresponds to an engine rotational speed of K1). If the vehicle speed is less than the second value K2, a return is performed, while if the vehicle speed is greater than or equal to the second value K2, in Step S24, the controls unit 10 control an operating parameter so as to decrease the vehicle speed, after which a return is performed.

In the operating mode illustrated in FIG. 5, the control unit 10 determines the vehicle speed using the vehicle speed sensor 1 only when the vehicle is not operating in a steady state. However, if Step S21 is replaced by a step in which the control unit 10 determines whether the engine rotation sensor 2 is functioning properly, this operating mode can be altered so that the control unit 10 determines the vehicle speed from the engine rotation 2 when the engine rotation sensor 2 is operating normally and determines the vehicle speed from the vehicle speed sensor 1 whenever the engine rotation sensor 2 malfunctions.

FIG. 6 is a flow chart illustrating another operating mode of the embodiment of FIG. 1. In this operating mode, the control unit 10 normally determines the vehicle speed based on the output signal from the vehicle speed sensor 1 and determines the vehicle speed based on the output signal from the engine rotation sensor 2 whenever the vehicle speed sensor 1 malfunctions. The vehicle speed sensor 1 is determined to have malfunctioned whenever the ratio X of the vehicle speed (indicated by the vehicle speed sensor 1) to the engine rotational speed (indicated by the engine rotation sensor 2) falls outside of a prescribed range. The upper limit on the prescribed range for X is determined by the reduction ratio of the transmission in high gear, while the lower limit is determined by the reduction ratio of the transmission in low gear. If X falls outside of this range, it means that either the vehicle speed sensor 1 or the engine rotation sensor 2 is malfunctioning. Since the vehicle speed sensor 1 has a much greater probability of failure than the engine rotation sensor 2, it is assumed that the vehicle speed sensor 1 has failed.

In Step S30, the control unit 10 calculates the ratio X based on the output signals from the vehicle speed sensor 1 and the engine rotation sensor 2. In Step S31, it determines whether the ratio X lies within the prescribed range. If it does, then the vehicle speed sensor 1 is determined to be normal, so in Step S32, it is determined whether the vehicle speed indicated by the vehicle speed sensor 1 is greater than or equal to a second value K2. If the vehicle speed is less than the second value K2, a return is performed, while if it is greater than or equal to the second value K2, in Step S34, the control unit 10 controls an engine operating parameter, such as the combustion ratio, the throttle opening, or the brake pressure, so as to decrease the vehicle speed. If in Step S31 the ratio X is outside the prescribed range, it is determined that the vehicle speed sensor 1 has malfunctioned, so the control unit 10 uses the output signal from the engine rotation sensor 2 as an indication of the vehicle speed, and in Step S33, it determines whether the engine rotational speed is greater than or equal to a first value K1. If the engine speed is less than the first value K1, a return is performed, while if the engine speed is greater than or equal to the first value K1, in Step S34, the control unit 10 controls an operating parameter so as to decrease the vehicle speed, after which a return is performed.

The first value K1 can either be a constant value corresponding to operation of the transmission in its highest gear (as in the operating mode of FIG. 3), or it can be a value which changes in magnitude according to the gear in which the transmission is presently operating (as in the operating mode of FIG. 4). Similarly, the second value K2 can be either a constant value or one which changes in accordance with the gear position.

The ratio X has a unique value for each gear position of the transmission. Therefore, instead of determining whether X falls into a prescribed range in Step S31, it can be determined whether X equals one of the unique values. If it does and if the value corresponds to the gear in which the transmission is currently operating, then the vehicle speed sensor 1 is operating properly.

In the above-described operating modes, the control unit uses the output signal from either the vehicle speed sensor 1 or the engine rotation sensor 2 to determine the vehicle speed during normal operation. However, it is also possible to use the output signal from one of the other sensors 3 to determine the vehicle speed during normal operation, and then to use one of sensors 1 and 2 when the other sensor 3 malfunctions. For example, the other sensors 3 can include a ground speed sensor that directly senses the ground speed of the vehicle using ultrasonic waves. The ground speed sensor can be used during normal conditions, and when the control unit 10 determines that the ground speed sensor is malfunctioning or inappropriate (such as when the road surface is extremely rough), the control unit 10 can use the output signal from the vehicle speed sensor 1 to determine the vehicle speed. The failure of the ground speed sensor can be detected by determining when the ratio of the ground speed (as indicated by the ground speed sensor) to the engine rotational speed (as indicated by the engine rotation sensor 2) falls outside a prescribed range. Since the engine rotation sensor 2 is highly reliable, the ratio is presumed to fall outside of the prescribed range only when the ground speed sensor malfunctions. Furthermore, if the vehicle speed sensor 1 subsequently malfunctions, the control unit 10 can switch to the engine rotation sensor 2 to determine the vehicle speed.

The second value K2, i.e., the vehicle speed at which the control unit 10 begins to control an operating parameter of the vehicle will depend upon the purpose for which the speed governor is to be used. If the purpose is primarily to prevent the vehicle from running at a speed which can cause engine damage, the second value K2 will be set at a level corresponding to a very high engine speed for each gear stage in the transmission. An appropriate maximum vehicle speed for each gear can be determined in advance from the engine characteristics, the reduction ratios of the transmission and differential, and the size of the tires of the vehicle and can be stored in the memory of the control unit 10 at the time of manufacture. However, a speed governor according to the present invention is not limited to use at high vehicle speeds or high engine speeds and can also be used to limit the speed of a vehicle to low speeds, such as 25-30 mph. Therefore, it is useful for preventing a vehicle from traveling faster than the legal speed limit. Since the legal speed limit varies from location to location, when the speed governor is to be used for the purpose of preventing the vehicle from exceeding the legal speed limit, the control unit 10 may be equipped with an input device which enables the driver of the vehicle to input the present legal speed limit into a memory of the control unit 10, and the control unit 10 can use the speed input by the driver as the second value K2.

The present invention has been described with respect to its use with an engine of an automobile. However, the present invention can be employed to govern the speed of any internal combustion engine, regardless of where it is installed. For example, it can be used to limit the speed of an engine for powering a boat, a lawn mower, an aircraft, a compressor, or farm machinery.

What is claimed is:

1. A vehicle speed governor for a vehicle equipped with an engine comprising:
   sensor for sensing an operating condition of the vehicle indicative of the vehicle speed; and
   control means responsive to the sensor for periodically and temporarily interrupting combustion in the engine in a perdetermined, cyclical manner when the vehicle speed indicated by the operating condition exceeds a prescribed speed, and for automatically terminating said combustion interruption when the vehicle speed falls below the prescribed speed.

2. A speed governor as claimed in claim 1, wherein the sensor comprises an engine rotation sensor for sensing the rotational speed of the engine.

3. A speed governor as claimed in claim 1, wherein the sensor comprises a vehicle speed sensor.

4. A speed governor as claimed in claim 1, wherein the control means comprises means for periodically cutting off current to spark plugs of the engine.

5. A speed governor as claimed in claim 1, wherein the control means comprises means for periodically cutting off the supply of fuel to the engine.

6. A speed governor as claimed in claim 1, wherein the control means includes means for applying brakes of the vehicle when the vehicle speed exceeds the prescribed speed.

7. A speed governor as claimed in claim 1, wherein the control means includes means for reducing the opening of a throttle valve for the engine when the vehicle speed exceeds the prescribed speed.

8. A speed governor as claimed in claim 1, wherein the vehicle includes a transmission having a plurality of gear settings, and the prescribed speed is a vehicle speed which occurs when the transmission is in its highest gear setting.

9. A speed governor as claimed in claim 1, wherein the vehicle includes a transmission having a plurality of gear settings, the speed governor further comprising means for determining the current gear setting of the transmission and means for setting the prescribed speed in accordance with the current gear setting.

10. A vehicle speed governor for a vehicle equipped with an engine comprising:
    a first sensor for sensing a first operating condition of the vehicle indicative of the vehicle speed and generating a first signal;
    a second sensor for sensing a second operating condition of the vehicle indicative of the vehicle speed and generating a second signal;
    determining means for determining whether the first signal is appropriate for indicating the vehicle speed; and
    control means for calculating the vehicle speed using the first signal when the determining means determines that the first signal is appropriate and for calculating the vehicle speed using the second signal when the determining means determines that the first signal is inappropriate, and for periodically and temporarily decelerating the vehicle in a predetermined, cyclical manner when the calculated vehicle speed exceeds a prescribed speed.

11. A speed governor as claimed in claim 10 wherein:
    the first sensor comprises a vehicle speed sensor and the first signal indicates the vehicle speed;
    the second sensor comprises an engine rotation sensor and the second signal indicates the engine rotational speed; and
    the determining means comprises means for calculating the ratio of the vehicle speed indicated by the first signal and the engine rotational speed indicated by the second signal and determining that the first signal is innaproriate when the ratio falls outside a prescribed range.

12. A speed governor as claimed in claim 10, wherein:
    the vehicle is equipped with a clutch;
    the first sensor comprises an engine rotation sensor and the first signal indicates the engine rotational speed; and
    the determining means comprises means for sensing the state of engagement of the clutch and determining that the first signal is inappropriate when the clutch is in a partly engaged state.

13. A speed governor for an internal combustion engine comprising:
    a sensor for sensing an operating condition indicative of the engine rotational speed; and
    control means responsive to the sensor for periodically and temporarily interrupting combustion in the engine in a predetermined, cyclical manner when the engine rotational speed indicated by the operating condition exceeds a prescribed speed, and for automatically terminating said combustion interruption when the engine rotational speed falls below the prescribed speed.

14. A speed governing method for a vehicle comprising:
    sensing a first operating condition of the vehicle indicative of the vehicle speed;
    determining the vehicle speed from the first operating condition;
    periodically and temporarily interrupting combustion in the engine in a predetermined, cyclical manner when the vehicle speed indicated by the first operating condition exceeds a prescribed speed; and
    automatically terminating said combustion interruption when the vehicle speed falls below the prescribed speed.

15. A method as claimed in claim 14 wherein stopping combustion comprises periodically cutting off current to spark plugs of the engine.

16. A method as claimed in claim 14 wherein interrupting combustion comprises periodically cutting off fuel to the engine.

17. A method as claimed in claim 14, wherein the prescribed speed is a vehicle speed occurring when a transmission of the vehicle is in its highest gear position.

18. A method as claimed in claim 14, further comprising determining the current gear position of a transmission of the vehicle and changing the prescribed speed according to the current gear position of the transmission.

19. A method as claimed in claim 14 further comprising:

sensing a second operating condition indicative of the vehicle speed;

determining whether the first operating condition is appropriate for indicating the vehicle speed;

determining the vehicle speed based on the second operating condition when the first operating condition is inappropriate; and periodically interrupting combustion in the engine when the vehicle speed indicated by the second operating condition exceeds the prescribed speed.

20. A speed governor as claimed in claim 10, wherein the control means includes means for applying brakes of the vehicle when the vehicle speed exceeds the prescribed speed.

* * * * *